United States Patent
Hjelm et al.

(10) Patent No.: US 9,210,035 B2
(45) Date of Patent: Dec. 8, 2015

(54) SYSTEM, SERVERS, METHODS AND COMPUTER PROGRAMS FOR MACHINE-TO-MACHINE EQUIPMENT MANAGEMENT

(75) Inventors: Johan Hjelm, Tokyo (JP); Guido Gehlen, Neuss (DE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 290 days.

(21) Appl. No.: 13/983,945

(22) PCT Filed: Feb. 17, 2011

(86) PCT No.: PCT/SE2011/050176
§ 371 (c)(1),
(2), (4) Date: Aug. 6, 2013

(87) PCT Pub. No.: WO2012/112091
PCT Pub. Date: Aug. 23, 2012

(65) Prior Publication Data
US 2013/0339512 A1 Dec. 19, 2013

(51) Int. Cl.
*G06F 15/16* (2006.01)
*G06F 15/173* (2006.01)
(Continued)

(52) U.S. Cl.
CPC ............. *H04L 41/042* (2013.01); *H04W 4/003* (2013.01); *H04W 4/021* (2013.01); *H04W 12/06* (2013.01); *H04W 4/005* (2013.01)

(58) Field of Classification Search
CPC ..... H04W 4/005; H04W 12/04; H04W 12/06; H04W 60/00; H04W 12/02
See application file for complete search history.

(56) References Cited

U.S. PATENT DOCUMENTS

2003/0227395 A1 12/2003 Zeineh
2004/0018836 A1 1/2004 Jang
(Continued)

FOREIGN PATENT DOCUMENTS

WO 9634500 A1 10/1996
WO 03009610 A1 1/2003
(Continued)

OTHER PUBLICATIONS

3RD Generation Partnership Project, 3GPP TR 33.812 V9.2.0 (Jun. 2010), 3rd Generation Partnership Project; Technical Specification Group Services and System Aspects; Feasibility study on the security aspects of remote provisioning and change of subscription for Machine to Machine (M2M) equipment (Release 9), Jun. 2010, pp. 1-87.

Primary Examiner — Peling Shaw
(74) Attorney, Agent, or Firm — Murphy, Bilak & Homiller, PLLC (57) ABSTRACT

It is presented a method for machine-to-machine equipment management, executed in a subscription server arranged to provide an electronically transferable subscriber identity module. The method comprises the steps of: receiving a request for the electronically transferable subscriber identity module for a machine-to-machine equipment; obtaining a location rule; obtaining a calculated authorized area based on the location rule and a position of the machine-to-machine equipment; generating an electronically transferable subscriber identity module; sending the electronically transferable subscriber identity module to the machine-to-machine equipment; obtaining a position of the machine-to-machine equipment; determining whether the position indicates that the machine-to-machine equipment is outside of the calculated authorized area; and when the position indicates that the machine-to-machine equipment is outside of the calculated authorized area, restricting operation of the machine-to-machine equipment. It is also presented a corresponding system, subscription server, registration server, methods, computer programs and computer program products.

14 Claims, 5 Drawing Sheets

(51) Int. Cl.
   *H04L 12/24* (2006.01)
   *H04W 4/00* (2009.01)
   *H04W 4/02* (2009.01)
   *H04W 12/06* (2009.01)

(56) References Cited

U.S. PATENT DOCUMENTS

| | | |
|---|---|---|
| 2006/0030333 A1 | 2/2006 | Ward et al. |
| 2006/0046746 A1 | 3/2006 | Ranford et al. |
| 2008/0207218 A1 | 8/2008 | Craine et al. |
| 2009/0140886 A1 | 6/2009 | Bender |
| 2010/0057485 A1* | 3/2010 | Luft ................................ 705/1 |
| 2010/0148947 A1 | 6/2010 | Morgan et al. |
| 2011/0053619 A1* | 3/2011 | Shaheen et al. ............... 455/466 |
| 2012/0047551 A1* | 2/2012 | Pattar et al. ....................... 726/1 |
| 2012/0124201 A1* | 5/2012 | Muhanna et al. ............. 709/224 |
| 2012/0170451 A1* | 7/2012 | Viswanathan et al. ........ 370/230 |
| 2012/0173743 A1* | 7/2012 | Yu ................................. 709/228 |
| 2012/0220326 A1* | 8/2012 | Li et al. .......................... 455/509 |
| 2013/0079051 A1* | 3/2013 | Aidee et al. ................. 455/550.1 |

FOREIGN PATENT DOCUMENTS

| | | |
|---|---|---|
| WO | 2008076118 A1 | 6/2008 |
| WO | 2009092115 A2 | 7/2009 |

* cited by examiner

SYSTEM, SERVERS, METHODS AND COMPUTER PROGRAMS FOR MACHINE-TO-MACHINE EQUIPMENT MANAGEMENT

TECHNICAL FIELD

The invention relates to machine-to-machine solutions and in particular to machine-to-machine equipment management.

BACKGROUND

Machine-to-machine (M2M) solutions are increasing in popularity. M2M can for example be used to collect data from M2M equipment (M2ME) in various locations to an M2M application running centrally. For example, a sensor, such as an electricity meter, thermometer, or drink machine stock sensor can be used to collect data from M2MEs to an M2M application. M2MEs can also be used for more interactive applications such as remote control of machinery.

2009/092115 discloses a method and apparatus for performing secure Machine-to-Machine (M2M) provisioning and communication. It is disclosed various events to detect tampering of M2M enabled equipment (M2ME). These events include (1) remediable and/or un-remediable compromise of the OS by malware or viruses; (2) buffer overflow events; (3) sudden unexpected or unauthorized changes in radio or higher-layer connectivity characteristics and/or environmental readings; (4) excessively repeated failure and/or denial of access or service by trusted network elements for the M2ME's requests for preliminary authentication, registration, or MID provisioning; or (5) any unexpected/unauthorized change in a post-boot or run-time reading of 'trust state' of the M2ME 110 or M2ME subsystem relating to remote MID management functionality. However, it is not disclosed how to control location aspects of M2ME.

It is thus desired to provide location control of M2MEs.

SUMMARY

An object of the invention is to provide location control of machine-to-machine equipment.

A first embodiment is a system for machine-to-machine equipment management comprising a subscription server arranged to provide an electronically transferable subscriber identity module, and a registration server arranged to provide connectivity to a machine-to-machine equipment. The subscription server comprises: a module creator arranged to receive a request from the registration server for an electronically transferable subscriber identity module for the machine-to-machine equipment and to generate the electronically transferable subscriber identity module; a policy storage module arranged to store a location rule to be applied for the machine-to-machine equipment; a communication module arranged to obtain a calculated authorised area from the registration server based on the location rule and a position of the machine-to-machine equipment, to send the electronically transferable subscriber identity module via the registration server to the machine-to-machine equipment, to obtain a position of the machine-to-machine equipment from the registration server; and a policy enforcer arranged to restrict operation of the machine-to-machine equipment when the position indicates that the machine-to-machine equipment is outside of the calculated authorised area. The registration server comprises: a communication module arranged to receive a location rule message from the subscriber server, the location rule message comprising a location rule to be applied for the machine-to-machine equipment, and to send the calculated authorised area to the subscription server; a position obtainer arranged to obtain a position of the machine-to-machine equipment; and a controller arranged to calculate the calculated authorised area using the location rule and the position.

A second embodiment is a subscription server for machine-to-machine equipment management and for providing an electronically transferable subscriber identity module. The subscription server comprises: a module creator arranged to receive a request for an electronically transferable subscriber identity module for a machine-to-machine equipment and to generate the electronically transferable subscriber identity module; a policy storage module arranged to store a location rule to be applied for the machine-to-machine equipment; a communication module arranged to obtain a calculated authorised area based on the location rule and a position of the machine-to-machine equipment, to send the electronically transferable subscriber identity module to the machine-to-machine equipment, and to obtain a position of the machine-to-machine equipment; a policy enforcer arranged to restrict operation of the machine-to-machine equipment when the position indicates that the machine-to-machine equipment is outside of the calculated authorised area.

Using presented subscription server, usage of M2ME is conveniently controlled at subscription server level, where control of the subscription is available.

The policy enforcer may be arranged to disable the electronically transferable subscriber identity module when the position indicates that the machine-to-machine equipment is outside of the calculated authorised area. By disabling the electronically transferable subscriber identity module, an evident and effective sanction for any location rule violation is applied.

The policy enforcer may be arranged to constrain access of the electronically transferable subscriber identity module when the position indicates that the machine-to-machine equipment is outside of the calculated authorised area. Constraining access can for instance include one or more of: limiting bandwidth, restricting network traffic in terms of what nodes (e.g. internet protocol addresses) are made available.

The module creator may be arranged to generate the electronically transferable subscriber identity module comprising the position. By including the position in the electronically transferable subscriber identity module, greater control of location is achieved, since it is difficult to manipulate the electronically transferable subscriber identity module.

The communication module may be arranged to verify authorisation for the subscription server to obtain the position for the machine-to-machine equipment.

The communication module may be arranged to obtain a location rule based on an identity of the machine-to-machine equipment. In other words, the rules can be stored per M2ME, allowing flexible control and configuration of location rules.

A third embodiment is a method for machine-to-machine equipment management, executed in a subscription server arranged to provide an electronically transferable subscriber identity module. The method comprises the steps of: receiving a request for the electronically transferable subscriber identity module for a machine-to-machine equipment; obtaining a location rule to be applied for the machine-to-machine equipment; obtaining a calculated authorised area based on the location rule and a position of the machine-to-machine equipment; generating an electronically transferable subscriber identity module; sending the electronically transferable subscriber identity module to the machine-to-machine equipment; obtaining a position of the machine-to-machine equipment; determining whether the position indicates that the machine-to-machine equipment is outside of the calculated authorised area; and when the position indicates that the machine-to-machine equipment is outside of the calculated authorised area, restricting operation of the machine-to-machine equipment.

The step of restricting operation may comprise disabling the electronically transferable subscriber identity module.

The step of restricting operation may comprise constraining access of the electronically transferable subscriber identity module. Constraining access can for instance include one or more of: limiting bandwidth, restricting network traffic in terms of what nodes (e.g. internet protocol addresses) are made available.

The step of obtaining a location rule may comprise obtaining a location rule based on an identity of the machine-to-machine equipment.

The step of generating may comprise generating the electronically transferable subscriber identity module comprising the position.

The step of obtaining a position may comprise verifying authorisation for the subscription server to obtain the position for the machine-to-machine equipment.

The steps of obtaining the position, determining and restricting operation may be repeated.

A fourth embodiment is a computer program for machine-to-machine equipment management using a subscription server arranged to provide an electronically transferable subscriber identity module. The computer program comprises computer program code which, when executed in a controller of the subscription server, causes the subscription server to: receive a request for the electronically transferable subscriber identity module for a machine-to-machine equipment; obtain a location rule to be applied for the machine-to-machine equipment; obtain a calculated authorised area based on the location rule and a position of the machine-to-machine equipment; generate an electronically transferable subscriber identity module; send the electronically transferable subscriber identity module to the machine-to-machine equipment; obtain a position of the machine-to-machine equipment; determine whether the position indicates that the machine-to-machine equipment is outside of the calculated authorised area; and when the position indicates that the machine-to-machine equipment is outside of the calculated authorised area, restrict operation of the machine-to-machine equipment.

A fifth embodiment is a computer program product comprising a computer program according to the fourth embodiment and a computer readable means on which the computer program is stored.

A sixth embodiment is a registration server for machine-to-machine equipment management arranged for providing connectivity to a machine-to-machine equipment. The registration server comprises: a communication module arranged to receive a location rule message comprising a location rule to be applied for a machine-to-machine equipment, and to send a calculated authorised area to a subscription server arranged to provide an electronically transferable subscriber identity module; a position obtainer arranged to obtain a position of the machine-to-machine equipment; and a controller arranged to calculate the calculated authorised area using the location rule and the position, the calculated authorised area defining an area within which the machine-to-machine equipment is authorised to function.

The registration server may further comprise a policy engine arranged to send a message to the subscription server to restrict operation of the machine-to-machine equipment when the position indicates that the machine-to-machine equipment is outside of the calculated authorised area.

The registration server may further be arranged to, when the position indicates that the machine-to-machine equipment is outside of the calculated authorised area, send a message to the subscription server to restrict operation of the machine-to-machine equipment A seventh embodiment is a method for machine-to-machine equipment management, executed in a registration server arranged to provide connectivity to a machine-to-machine equipment, the method comprising the steps of: receiving a location rule message comprising a location rule to be applied for a machine-to-machine equipment; obtaining a position of the machine-to-machine equipment; calculating a calculated authorised area using the location rule and the position, the calculated authorised area defining an area within which the machine-to-machine equipment is authorised to function; and sending the calculated authorised area to a subscription server arranged to provide an electronically transferable subscriber identity module.

The method may further comprise the steps of: determining whether the position indicates that the machine-to-machine equipment is outside of the calculated authorised area; and when the position indicates that the machine-to-machine equipment is outside of the calculated authorised area, sending a message to the subscription server to restrict operation of the machine-to-machine equipment.

An eighth embodiment is a computer program for machine-to-machine equipment management using a registration server arranged to provide connectivity to a machine-to-machine equipment, the computer program comprising computer program code which, when executed in a controller of the registration server, causes the registration server to: receive a location rule message comprising a location rule to be applied for a machine-to-machine equipment; obtain a position of the machine-to-machine equipment; calculate a calculated authorised area using the location rule and the position, the calculated authorised area defining an area within which the machine-to-machine equipment is authorised to function; and send the calculated authorised area to a subscription server arranged to provide an electronically transferable subscriber identity module.

A ninth embodiment is a computer program product comprising a computer program according to the eighth embodiment and a computer readable means on which the computer program is stored.

It is to be noted that any feature of the first, second, third, fourth, fifth, sixth, seventh, eighth and ninth embodiments may, where appropriate, be applied to any other of these embodiments.

Generally, all terms used in the application are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
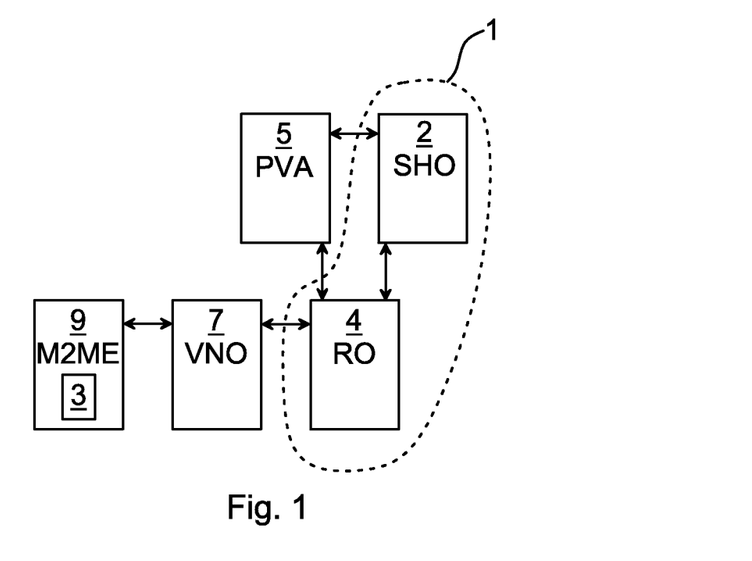
FIG. 1 is a schematic diagram illustrating an environment where embodiments disclosed herein can be applied.

FIG. 1 is a schematic diagram illustrating an environment where embodiments disclosed herein can be applied. An M2ME 9 (M2M equipment) is a field device in the M2M network. To be able to communicate, the M2ME 9 needs a subscription token, such as a USIM (Universal Subscriber Identity Module). The USIM can be provided using a physical card or by an electronically transferable subscriber identity module 3 such as an MCIM (Machine Communications Identity Module), which can be downloaded to the M2ME 9.

The use of MCIM to establish the credentials of users and terminals is described in more detail in a 3GPP document TR 33.812. In that document, it is described how the M2ME 9 can initially attach to a VNO (Visited Network Operator) using standard 3GPP radio technologies, receive initial credentials (or authentication message) and is granted an authorisation for a limited set of operations by the VNO 7. According to TR 33.812, the M2ME 9 then uses this limited authorisation, such as permission to only access a RO (Registration Operator) 4 to trigger authentication and authorisation of the connection to an SHO (Selected Home Operator) 2, who is a provider of shared secrets, authorisation certificates, and services which are attached to the subscription of the user of the terminal. The RO 4 is also referred to as a registration server and the SHO 2 is also referred to as a subscription server 2. When granted authorisation to do so by the subscription server 2, these shared secrets, authorisation certificates, etc. are downloaded into a secure area of the M2ME 9, so that the shared secret and authentication certificates can be used to authenticate and authorise the M2ME 9 as being used under the subscription in question towards the network to which it has attached.

A PVA (Platform Validation Authority) 5 is an authority responsible for validating the credentials used to verify the M2ME 9 as a trusted platform. The PVA may also issue these credentials.

The subscription server 2 and the registration server 4 together make up a system 1 for position monitoring of M2ME 9.

Figure 2:
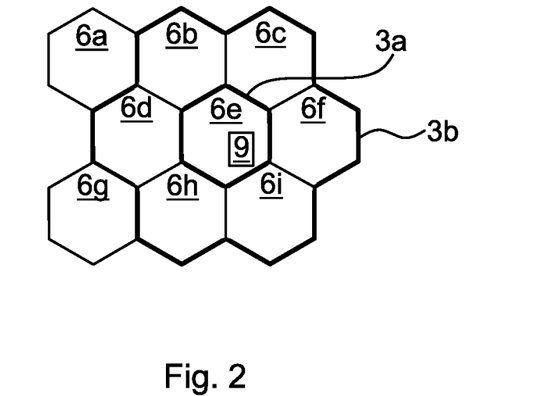
FIG. 2 is a schematic diagram illustrating how a position of an M2M equipment of FIG. 1 can be tracked.

FIG. 2 is a schematic diagram illustrating how a position of an M2M equipment 9 of FIG. 1 can be tracked. This provides a solution to a problem of ensuring that the M2ME 9 does not operate outside its authorised area. Such M2ME devices can be for example be provided in mobile robots, forklifts, etc. Alternatively, this solution can also be applied to location limited subscriptions, which are limited to a certain authorised area.

FIG. 2 shows a number of cells 6a-6i, as is common in mobile communication networks. The actual layout of the cells may vary and different cells can have different sizes. However, for reasons of clarity, all cells 6a-6i are here shown with the same size. The M2ME 9 is located in cell 6e. In this example, an authorised area 3a for the M2ME 9 is defined as cell 6e. In other words, the M2ME 9 is allowed to operate normally within its authorised area 3a. Optionally, a warning area 3b can be defined. In this example, there is a warning area 3b comprising all cells being adjacent to the cell 6e of the authorised area 3a. The warning area 3b can be used in such a way that when the M2ME is outside the authorised area 3a but within the warning area 3b, a message is sent to the M2ME 9 warning that it is outside the authorised area 3a, but the M2ME 9 can optionally still be allowed to function as long as it is inside the warning area 3b.

If the warning area 3b is not used, operation of the M2ME 9 is restricted whenever it is outside the authorised area 3a. If the warning area 3b is used, operation of the M2ME 9 is restricted when it is outside the warning area 3b. In one embodiment, less restrictive restrictions are applied to the M2ME 9 when it is outside the authorised area 3a but inside the warning area 3b.

The restricting operation of the M2ME 9 can be to disable the electronically transferable subscriber identity module, and a less restrictive restriction can for example be to constrain access by performing one or more of the following: limiting bandwidth, restricting network traffic in terms of what nodes (e.g. internet protocol addresses) are made available.

Figure 3:
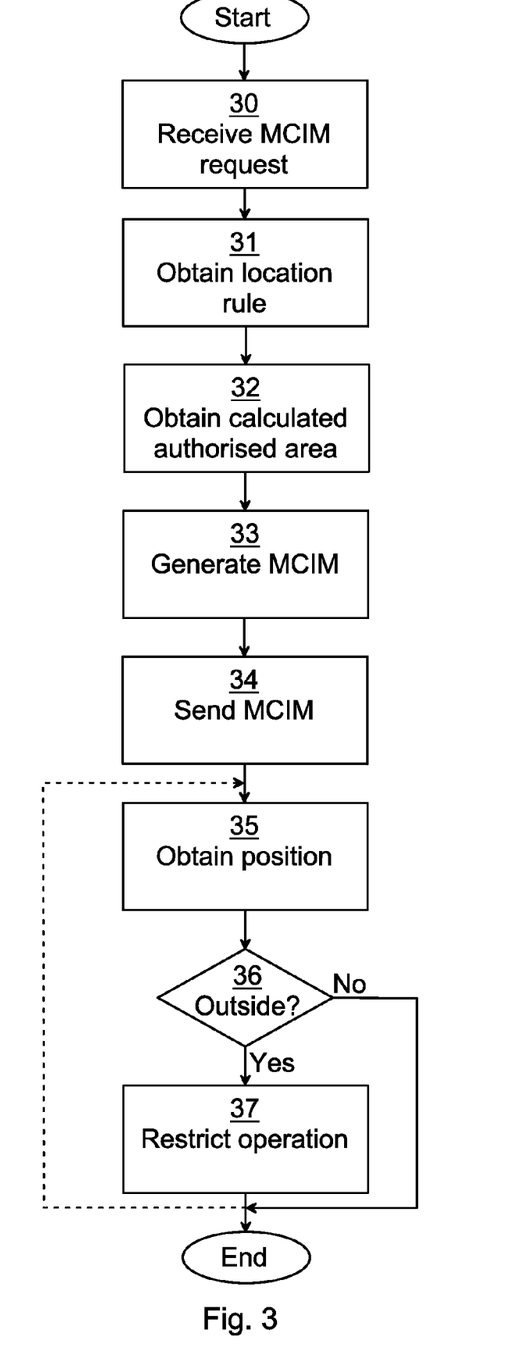
FIG. 3 is a flow chart illustrating an embodiment of a method executed in the subscription server of FIG. 1, FIGS. 4A-4B are flow charts illustrating two embodiments of a method executed in the registration server of FIG. 1.

FIG. 3 is a flow chart illustrating an embodiment of a method executed in the subscription server 2 of FIG. 1. The method will be described with flow chart references of FIG. 3 and entity references of FIG. 1.

In an initial receive MCIM request step 30, the subscription server 2 receives a request for the electronically transferable subscriber identity module 3 for the M2ME 9.

In an obtain location rule step 31, a location rule to be applied for the machine-to-machine equipment 9 is received. The location rule can for example be that this particular M2ME 9 is only allowed to operate within the cell where it is located when the MCIM is issued.

In a step 32 to obtain a calculated authorised area, a calculated authorised area is obtained, based on the location rule. The calculated authorised area can for example be cell with ID x, or within a polygon limited by a set of longitude/latitude co-ordinates.

In a generate MCIM step 33, the electronically transferable subscriber identity module 3 is generated.

In a send MCIM step, the electronically transferable subscriber identity module 3 is sent to the M2ME 9.

In an obtain position step 35, a position of the M2ME 9 is obtained.

In a conditional outside step 36, it is determined whether the position of the M2ME indicates that the M2ME is outside of the calculated authorised area. If the M2ME is indicated to be outside the calculated authorised area, the method continues to a restrict operation step 37. Otherwise the method ends, or optionally, returns to the obtain position step 35.

In the restrict operation step 37, operation of the M2ME 9 is restricted. This can for example be implemented by disabling the electronically transferable subscriber identity module 3, or restrict data bandwidth. After this step, the method ends, or optionally, returns to the obtain position step 35.

Figure 4A:
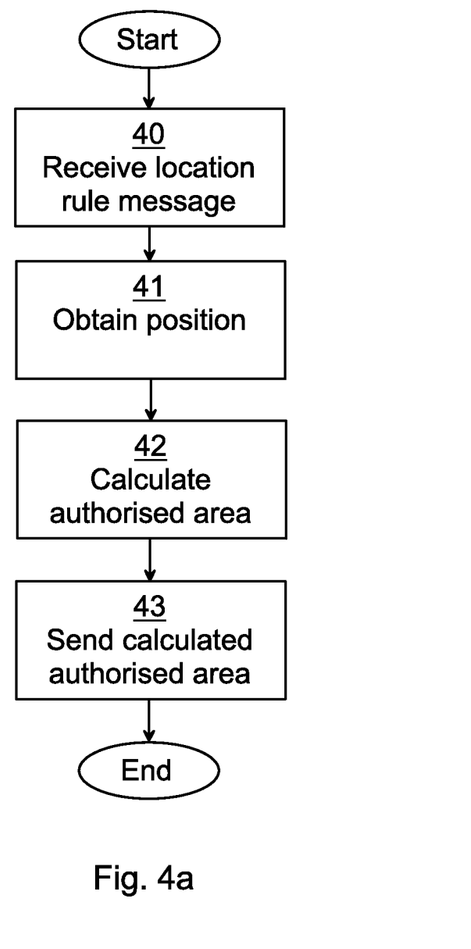
Figure 4B:
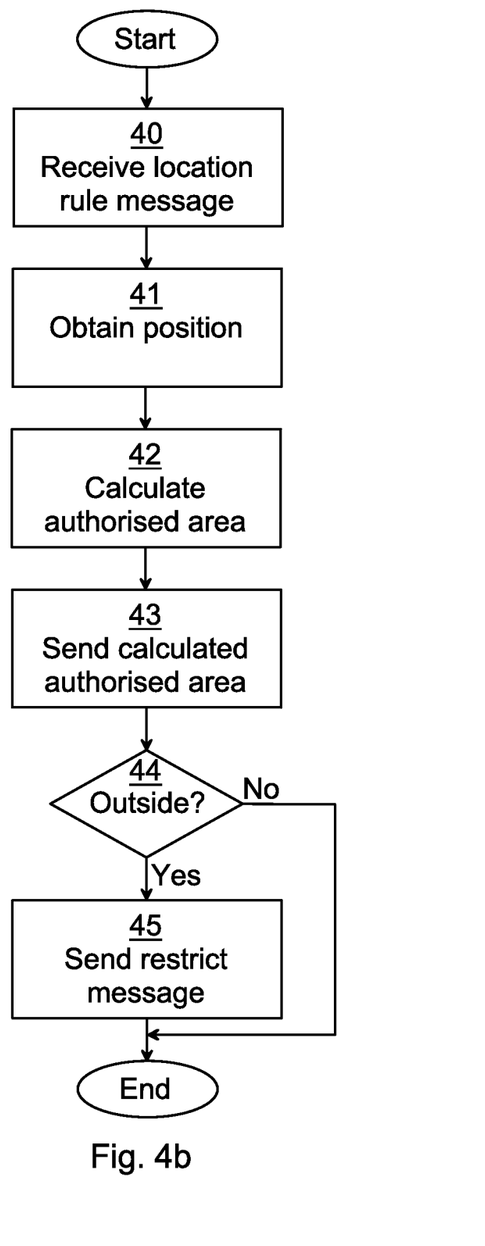

FIGS. 4A-4B are flow charts illustrating two embodiments of a method executed in the registration server of FIG. 1. The method will described with flow chart references of FIGS. 4A-4B and entity references of FIG. 1. FIG. 4a shows an embodiment with the basic steps.

In a receive location rule message step 40, a location rule message comprising the location rule to be applied for a machine-to-machine equipment 9 is received from the subscription server 2.

In an obtain position step 41, a position of the machine-to-machine equipment is obtained e.g. by querying the VNO 7 or the M2ME 9 itself or both.

In a calculate authorised area step 42, the authorised area is calculated using the location rule and the position. The calculated authorised area can for example be cell with ID x, or within a polygon limited by a set of longitude/latitude coordinates.

Once the calculated authorised area has been calculated, it is sent to the subscription server 2 in a send calculated authorised area step 43.

If FIG. 4b, steps 40 to 43 are identical to those of FIG. 4a. However here, after the step 43 to send calculated authorised area step 43, the method continues to a conditional outside step 44.

In the conditional outside step 44, it is determined whether the position of the M2ME 9 indicates that the M2ME 9 is outside of the calculated authorised area. If the M2ME 9 is indicated to be outside the calculated authorised area, the method continues to a send restrict message step 45. Otherwise the method ends.

In the send restrict message step 45, the restrict operation step 37, a message is sent to the subscription server 2 to restrict operation of the machine-to-machine equipment.

Figure 5:
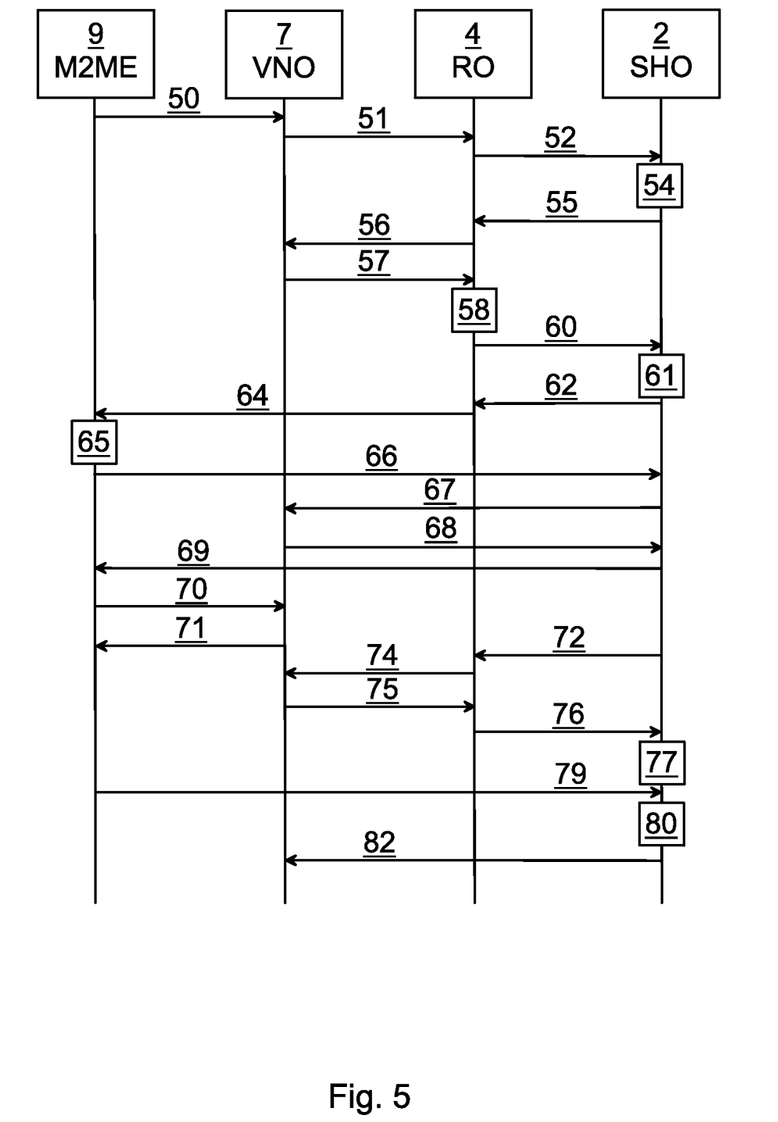
FIG. 5 is a sequence diagram illustrating communication corresponding to the methods of FIGS. 3 and 4A-4B.

FIG. 5 is a sequence diagram illustrating communication between entities of FIG. 1, the communication corresponding to the methods of FIGS. 3 and 4A-4B. The communication will described with sequence diagram references of FIG. 5 and entity references of FIG. 1.

First, the M2ME 9 attaches to the VNO 7 and requests 50 an MCIM. The VNO 7 forwards the request 51 to the registration server 4 which in turn forwards the request 52 to the subscription server 2, corresponding to step 30 in FIG. 3.

The subscription server 2, or a module creator 10 (FIG. 6a) in the subscription server 2, looks up 54 location rules pertaining to the authorisation of the M2ME 9 in a rule database. These rules have been created previously as part of the subscription of the owner of the MCIM to the service. This corresponds to step 31 of FIG. 3.

The module creator 10 (FIG. 6a) in the subscription server 2 discovers that the M2ME 9 should be authorised to operate only in an authorised area, and generates a set of location rules for the registration server 4 to execute to define the area.

The subscription server 2 thus sends 55 a location rule message to the registration server 4, effectively requesting an authorised area to be calculated by the registration server 4. This corresponds to step 32 of FIG. 3. The location rule message includes the location rules for the calculation of the authorised area. Optionally, the location rules can be received from the owners of the M2ME 9. This corresponds to step 40 of FIGS. 4a-4b.

The registration server 4 then requests 56 the current position of the M2ME 9 from the VNO 7, such as an SMLC (Serving Mobile Location Centre) in the VNO 7, corresponding to step 41 of FIGS. 4a-4b. The granularity can for example be at cell level. This assumes that the registration server 4 is authorised by the VNO 7 to request such positions of the M2ME 9. If finer granularity is desired, the registration server 4 can send a request to the M2ME 9 to position itself using GPS. The GPS position can then optionally be verified using the network position. If the GPS position and the network position relate to the same area, the GPS position can be assumed to be correct.

The position of the M2ME 9 is then received 57 by the registration server 4 from the VNO 7.

The registration server 4 then applies 58 the location rules to calculate the authorised area, corresponding to step 42 of FIGS. 4a-4b. Examples of location rules are "only current cell", "only current and adjacent cells", etc. The registration server 4 has the ability to translate the cell ID to coordinates, if it is trusted with the coordinates defining the cell areas. The registration server then sends 60 the calculated authorised area and the current position of the requesting M2ME 9 to the subscription server 2, corresponding to step 43 of FIGS. 4a-4b.

The subscription server 2 is then ready to generate 61 the MCIM (using long-term secret or other method), and can optionally include the position information in the MCIM, corresponding to step 33 of FIG. 3. The subscription server 2 can also generate a set of policies that are to be followed by the M2ME.

The subscription server 2 returns 62 the MCIM and the optional policies to the registration server 4, corresponding to step 34 of FIG. 3. Alternatively, the policies can be sent through a different route, e.g if the policies are not included in the MCIM, e.g. due to the implementation of a Discovery and Registration Function of the registration server 4.

The registration server 4 then sends 64 the MCIM to the M2ME 9, after which the M2ME 9 then processes 65 the MCIM by decrypting the MCIM, installing it, and discovers in the policies that it is only authorised within a certain area.

The M2ME 9 then connects 66 to the subscription server 2 and requests the subscription server 2 to authorise positioning of itself. The subscription server 2 requests 67 authorisation from the VNO 7 for the M2ME 9 to position itself, and the VNO 7 authorises 68 the M2ME 9 to look up its position in the SMLC of the VNO after which the subscription server 2 returns 69 the authorisation to the M2ME 9.

The M2ME 9 can then request 70 positioning of itself from the VNO 7, after which the VNO 7 obtains a position of the M2ME 9 and returns 71 the position to the M2ME 9.

The request for positioning authorisation also triggers the subscription server 2 to request 72 the position of the M2ME 9 from the registration server 4, corresponding to step 35 of FIG. 3. The registration server 4 requests 74 the position information from the VNO and the VNO 7 responds with position information 75 to the registration server 4. At this point, the registration server 4 is ready to forward 76 the position information to the subscription server 2.

The subscription server 2 uses the positioning to verify 77 that the M2ME 9 is in the authorised area, corresponding to step 36 of FIG. 3. This can be repeated periodically or performed continuously.

The registration server 4 can optionally continuously look up the position using the VNO 7. The position is then forwarded to the application controlling the M2ME 9. The periodicity may be set by the receiver, or by the registration server 4. It can be relatively long (hourly) or short (every minute), depending on the application. Such forwarding may go via the subscription server 2, or the registration server 4 and the receiver may have a business relationship, in which case the information may go directly to the receiver.

If the M2ME 9 passes outside the authorised area, the network attachment of the M2ME can be terminated, and it will have to request a new access. The system then revokes the MCIM, corresponding to step 37 of FIG. 3.

Optionally, warning messages can be displayed prior to revoking the MCIM if the M2ME is outside the authorised area (3a of FIG. 2) but inside the warnings area (3b of FIG. 2). The warning can be displayed on a user interaction part, such as a display, of the M2ME or connected device, allowing a user of the M2ME to react to avoid violating the location policy.

In another process, the M2ME 9 forwards 79 its position to the subscription server 2. The subscription server 2 then compares 80 the received position of the M2ME 9 with the position received from the VNO 7 through the registration server 4. If there is an inconsistency (within acceptable tolerances), this indicates an undesired condition, and the MCIM is revoked 82. The undesired condition can be a malicious user trying to trick the system by presenting an erroneous position, or that the M2ME 9 is being tampered with or even stolen.

To understand the workings of the embodiments described, consider the following use case. A remote controlled M2M container forklift in Yokohama Harbor can operate in areas of many different shipping companies. It is leased on an ad-hoc basis to the shipping companies. Each shipping company has its own relations with operators, who provides the MCIM for the forklift.

The harbor operation company acts as the registration server 4. The shipping operators lease areas for their containers and move them around on a daily basis, so there are no fixed areas or paths which can be set permanently in the forklift.

The forklift is remote controlled by the container crane operator, so it is dependent on connectivity to operate. A skilled operator can move the forklift with his left hand and the crane with his right.

However, the forklift is not allowed to operate outside the area of the shipping company it has currently been leased to, due to the risk of interference with other machinery. The allowed area is provisioned to the operator by the shipping company as a separate independent step. This is where embodiments described herein can be applied.

When the forklift is started in the morning, it registers its position with the subscription server 2. The subscription server 2 checks the allowed area of the day, and sets that up in the MCIM. It then transmits the MCIM to the forklift, and the policies determining the allowed area for the forklift to the registration server 4. Alternatively, the registration server 4 could calculate the allowed area, if this is based on business relations between the forklift owner and the harbour operator (the registration server 4). The registration server 4 then provides this information to the subscription server 2.

When the forklift is instructed by the crane operator to move outside the allowed area, it returns a warning to the crane operator.

If the crane continues to be moved outside the allowed area, for instance because it is controlled to do so by remote control of the operator, then the MCIM will become invalid and the forklift will stop. The crane would then have to be manually moved back into the allowed area, at which point the crane will set up again, re-validating the MCIM.

Another option, for vehicles which move along a path, is to insert allowed routes (as chains of coordinates) into the MCIM. If the M2ME diverges from the route, its connectivity will be revoked.

Figure 6A:
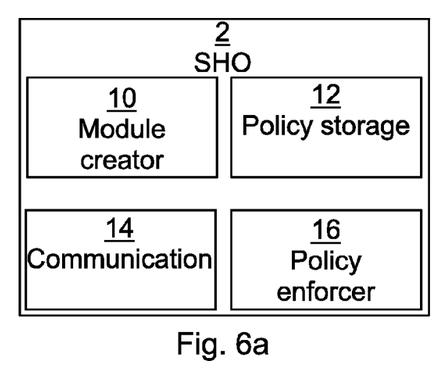
FIG. 6A is a schematic diagram showing functional modules of the subscription server of FIG. 1.

FIG. 6A is a schematic diagram showing functional modules of the subscription server 2 of FIG. 1. The modules can be implemented using hardware and/or software such as a computer program executing in the subscription server 2. All modules depend on an execution environment (not shown) which utilises the components shown in FIG. 6b. The modules correspond to steps of the method illustrated in FIG. 3.

A module creator 10 is arranged to receive a request for the MCIM for the M2ME 9 and to generate the MCIM.

A policy storage module 12 is arranged to store a location rule to be applied for the M2ME 9.

A communication module 14 is arranged to obtain a calculated authorised area based on the location rule and a position of the M2ME 9. The communication module 14 is also arranged to send the MCIM to the M2ME 9 and to actually obtain a position of the M2ME 9.

A policy enforcer 16 module is arranged to restrict operation of the M2ME 9 when the position is outside of the calculated authorised area.

Figure 6B:
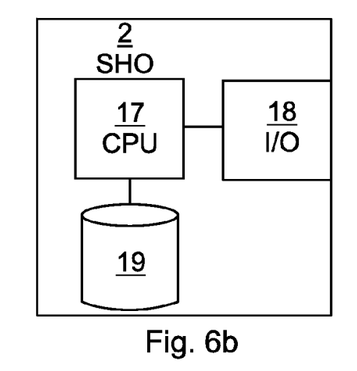
FIG. 6B is a schematic diagram showing some components of the subscription server of FIG. 1.

FIG. 6B is a schematic diagram showing some components of the subscription server of FIG. 1.

The subscription server 2 can be any suitable computer capable of performing the tasks as described herein. For example, the subscription server 2 can be a computer running an operating system such as Linux, Microsoft Windows, Apple Mac OS X, UNIX variants, etc.

A controller 17 is provided using any suitable central processing unit (CPU), microcontroller, digital signal processor (DSP), etc., capable of executing software instructions stored in a computer program product 19, e.g. in the form of a memory. The computer program product 19 can be a memory or any combination of read and write memory (RAM) and read only memory (ROM). The memory also comprises persistent storage, which, for example, can be any single one or combination of magnetic memory, optical memory, or solid state memory or even remotely mounted memory.

The subscription server 2 also comprises an I/O interface 18, thereby providing connectivity to the registration server 4 and the PVA 5.

Figure 7A:
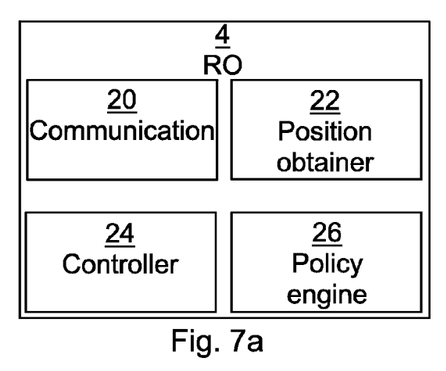
FIG. 7A is a schematic diagram showing functional modules of the registration server of FIG. 1.

FIG. 7A is a schematic diagram showing functional modules of the registration server 4 of FIG. 1. The modules can be implemented using hardware and/or software such as a computer program executing in the registration server 4. All modules depend on an execution environment (not shown) which utilises the components shown in FIG. 7b. The modules correspond to steps of the method illustrated in FIGS. 4a-4b.

A communication module 20 is arranged to receive the location rule message comprising the location rule to be applied for the M2ME 9. The communication module 20 is also arranged to send the calculated authorised area to the subscription server 2.

A position obtainer 22 is arranged to obtain a position of the M2ME 9.

A controller 24 is arranged to calculate the calculated authorised area using the location rule and the position.

A policy engine 26 is arranged to send a message to the subscription server 2 to restrict operation of the M2ME 9 when the position indicates that the M2ME 9 is outside of the calculated authorised area.

Figure 7B:
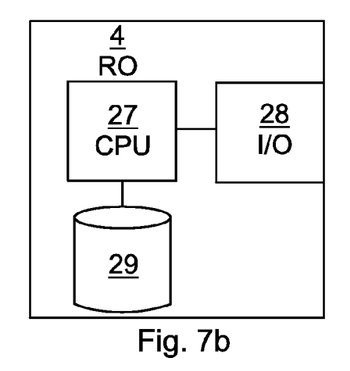
FIG. 7B is a schematic diagram showing some components of the registration server of FIG. 1.

FIG. 7B is a schematic diagram showing some components of the registration server 4 of FIG. 1. The registration server 4 can be any suitable computer capable of performing the tasks as described herein. For example, the registration server 4 can be a computer running an operating system such as Linux, Microsoft Windows, Apple Mac OS X, UNIX variants, etc.

A controller 27 is provided using any suitable central processing unit (CPU), microcontroller, digital signal processor (DSP), etc., capable of executing software instructions stored in a computer program product 29, e.g. in the form of a memory. The computer program product 29 can be a memory or any combination of read and write memory (RAM) and read only memory (ROM). The memory also comprises persistent storage, which, for example, can be any single one or combination of magnetic memory, optical memory, or solid state memory or even remotely mounted memory.

The registration server 4 also comprises an I/O interface 28, thereby providing connectivity to the subscription server 2, the VNO 7 and the PVA 5.

Figure 8:
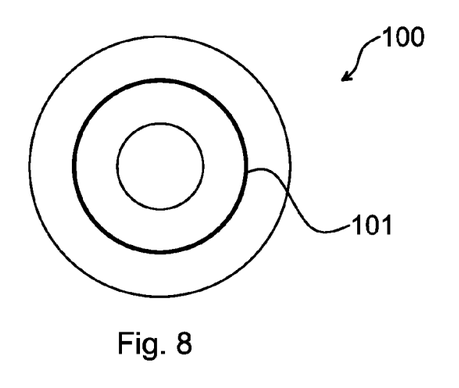
FIG. 8 shows one example of a computer program product comprising computer readable means.

FIG. 8 shows one example of a computer program product 100 comprising computer readable means. On this computer readable means a computer program 101 can be stored, which computer program can cause a controller to execute a method according to embodiments described herein. In this example, the computer program product is an optical disc, such as a CD (compact disc) or a DVD (digital versatile disc) or a Blu-Ray disc. As explained above, the computer program product could also be embodied as a memory of a device, such as memory 19 of the subscription server 2 or memory 29 of the registration server 4. While the computer program 101 is here schematically shown as a track on the depicted optical disk, the computer program can be stored in any way which is suitable for the computer program product.

Using embodiments described herein, the position of the M2ME can be used in the MCIM to bind the MCIM to a specific area. This can, for instance, be used to prevent unauthorised usage of the M2ME, or allocate radio and other resources to specific MCIM based on area and subscription.

An additional advantage of using the MCIM (or a Downloadable USIM) is that the MCIM can be dynamically configured.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A system for machine-to-machine equipment management comprising a subscription server arranged to provide an electronically transferable subscriber identity module, and a registration server arranged to provide connectivity to a machine-to-machine equipment, wherein the subscription server comprises:
   a policy storage module arranged to store a location rule to be applied for the machine-to-machine equipment;
   a communication module arranged to obtain a calculated authorised area from the registration server based on the location rule and a position of the machine-to-machine equipment, to send the electronically transferable subscriber identity module via the registration server to the machine-to-machine equipment, to obtain a position of the machine-to-machine equipment from the registration server;
   a module creator arranged to receive a request for an electronically transferable subscriber identity module for a machine-to-machine equipment and to generate the electronically transferable subscriber identity module comprising the position;
   a policy enforcer arranged to restrict operation of the machine-to-machine equipment when the position indicates that the machine-to-machine equipment is outside of the calculated authorised area such that when the position indicates that the machine-to-machine equipment is outside the calculated authorised area but within a warning area, less restrictive restrictions are applied than when the position indicates that the machine-to-machine equipment is outside the warning area; and
wherein the registration server comprises:
   a communication module arranged to receive a location rule message from the subscriber server, the location rule message comprising a location rule to be applied for the machine-to-machine equipment, and to send the calculated authorised area to the subscription server;
   a position obtainer arranged to obtain a position of the machine-to-machine equipment; and
   a controller arranged to calculate the calculated authorised area using the location rule and the position.

2. A subscription server for machine-to-machine equipment management and for providing an electronically transferable subscriber identity module, the subscription server comprising:
   a policy storage module arranged to store a location rule to be applied for the machine-to-machine equipment;
   a communication module arranged to obtain a calculated authorised area based on the location rule and a position of the machine-to-machine equipment, to send the electronically transferable subscriber identity module to the machine-to-machine equipment, and to obtain a position of the machine-to-machine equipment;
   a module creator arranged to receive a request for an electronically transferable subscriber identity module for a machine-to-machine equipment and to generate the electronically transferable subscriber identity module comprising information about the position; and
   a policy enforcer arranged to restrict operation of the machine-to-machine equipment when the position indicates that the machine-to-machine equipment is outside of the calculated authorised area such that when the position indicates that the machine-to-machine equipment is outside the calculated authorised area but within a warning area, less restrictive restrictions are applied than when the position indicates that the machine-to-machine equipment is outside the warning area.

3. The subscription server according to claim 2, wherein the policy enforcer is arranged to disable the electronically transferable subscriber identity module when the position indicates that the machine-to-machine equipment is outside of the calculated authorised area.

4. The subscription server according to claim 2, wherein the policy enforcer is arranged to constrain access of the electronically transferable subscriber identity module when the position indicates that the machine-to-machine equipment is outside of the calculated authorised area.

5. A method for machine-to-machine equipment management, executed in a subscription server arranged to provide an electronically transferable subscriber identity module, the method comprising the steps of:
   receiving a request for the electronically transferable subscriber identity module for a machine-to-machine equipment;
   obtaining a location rule to be applied for the machine-to-machine equipment;
   obtaining a calculated authorised area based on the location rule and a position of the machine-to-machine equipment;

generating an electronically transferable subscriber identity module comprising information about the position;

sending the electronically transferable subscriber identity module to the machine-to-machine equipment;

obtaining a position of the machine-to-machine equipment;

determining whether the position indicates that the machine-to-machine equipment is outside of the calculated authorised area;

when the position indicates that the machine-to-machine equipment is outside of the calculated authorised area, restricting operation of the machine-to-machine equipment; and when the position indicates that the machine-to-machine equipment is outside the calculated authorised area but within a warning area, applying less restrictive restrictions than when the position indicates that the machine-to-machine equipment is outside the warning area.

6. The method according to claim 5, wherein the step of restricting operation comprises disabling the electronically transferable subscriber identity module.

7. The method according to claim 5, wherein the step of restricting operation comprises constraining access of the electronically transferable subscriber identity module.

8. The method according to claim 5, wherein the step of obtaining a location rule comprises obtaining a location rule based on an identity of the machine-to-machine equipment.

9. The method according to claim 5, wherein the step of obtaining a position comprises verifying authorisation for the subscription server to obtain the position for the machine-to-machine equipment.

10. The method according to claim 5, wherein the steps of obtaining the position, determining and restricting operation are repeated.

11. A computer-readable medium storing a computer program for machine-to-machine equipment management using a subscription server arranged to provide an electronically transferable subscriber identity module, the computer program comprising computer program code which, when executed in a controller of the subscription server, causes the subscription server to:

receive a request for the electronically transferable subscriber identity module for a machine-to-machine equipment;

obtain a location rule to be applied for the machine-to-machine equipment;

obtain a calculated authorised area based on the location rule and a position of the machine-to-machine equipment;

generate an electronically transferable subscriber identity module comprising information about the position;

send the electronically transferable subscriber identity module to the machine-to-machine equipment;

obtain a position of the machine-to-machine equipment;

determine whether the position indicates that the machine-to-machine equipment is outside of the calculated authorised area; and when the position indicates that the machine-to-machine equipment is outside of the calculated authorised area, restrict operation of the machine-to-machine equipment; and when the position indicates that the machine-to-machine equipment is outside the calculated authorised area but within a warning area, apply less restrictive restrictions than when the position indicates that the machine-to-machine equipment is outside the warning area.

12. A registration server for machine-to-machine equipment management arranged for providing connectivity to a machine-to-machine equipment, the registration server comprising:

a position obtainer arranged to obtain a position of the machine-to-machine equipment; and a controller arranged to calculate the calculated authorised area using the location rule and the position, the calculated authorised area defining an area within which the machine-to-machine equipment is authorised to function;

a communication module arranged to receive a location rule message comprising a location rule to be applied for a machine-to-machine equipment, and to send a calculated authorised area to a subscription server arranged to provide an electronically transferable subscriber identity module comprising information about the position;

a policy engine arranged to send a message to the subscription server to restrict operation of the machine-to-machine equipment when the position indicates that the machine-to-machine equipment is outside of the calculated authorised area; to send a message to the subscription server to apply less restrictive restrictions when the position indicates that the machine-to-machine equipment is outside the calculated authorised area but within a warning area, than when the position indicates that the machine-to-machine equipment is outside the warning area.

13. A method for machine-to-machine equipment management, executed in a registration server arranged to provide connectivity to a machine-to-machine equipment, the method comprising the steps of:

receiving a location rule message comprising a location rule to be applied for a machine-to-machine equipment;

obtaining a position of the machine-to-machine equipment;

calculating a calculated authorised area using the location rule and the position, the calculated authorised area defining an area within which the machine-to-machine equipment is authorised to function;

sending the calculated authorised area to a subscription server arranged to provide an electronically transferable subscriber identity module comprising information about the position;

determining whether the position indicates that the machine-to-machine equipment is outside of the calculated authorised area;

when the position indicates that the machine-to-machine equipment is outside of the calculated authorised area, sending a message to the subscription server to restrict operation of the machine-to-machine equipment; and when the position indicates that the machine-to-machine equipment is outside the calculated authorised area but within a warning area, sending a message to the subscription server to apply less restrictive restrictions than when the position indicates that the machine-to-machine equipment is outside the warning area.

14. A computer-readable medium storing a computer program for machine-to-machine equipment management using a registration server arranged to provide connectivity to a machine-to-machine equipment, the computer program comprising computer program code which, when executed in a controller of the registration server, causes the registration server to:

receive a location rule message comprising a location rule to be applied for a machine-to-machine equipment;

obtain a position of the machine-to-machine equipment;

calculate a calculated authorised area using the location rule and the position, the calculated authorised area defining an area within which the machine-to-machine equipment is authorised to function;

send the calculated authorised area to a subscription server arranged to provide an electronically transferable subscriber identity module comprising information about the position; and determine whether the position indicates that the machine-to-machine equipment is outside of the calculated authorised area;

when the position indicates that the machine-to-machine equipment is outside of the calculated authorised area, send a message to the subscription server to restrict operation of the machine-to-machine equipment; and when the position indicates that the machine-to-machine equipment is outside the calculated authorised area but within a warning area, send a message to the subscription server to apply less restrictive restrictions than when the position indicates that the machine-to-machine equipment is outside the warning area.

* * * * *